(12) United States Patent
Shin et al.

(10) Patent No.: US 7,970,716 B2
(45) Date of Patent: Jun. 28, 2011

(54) METHOD FOR EXPRESSING EMOTION AND INTENTION IN REMOTE INTERACTION AND REAL EMOTION SYSTEM THEREOF

(75) Inventors: Hee-Sook Shin, Daejon (KR); Jun-Young Lee, Daejon (KR); Jun-Seok Park, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 888 days.

(21) Appl. No.: 11/942,819

(22) Filed: Nov. 20, 2007

(65) Prior Publication Data

US 2008/0120258 A1 May 22, 2008

(30) Foreign Application Priority Data

Nov. 21, 2006 (KR) ........................ 10-2006-0115182

(51) Int. Cl.
*G06F 15/18* (2006.01)
(52) U.S. Cl. .......................................................... 706/12
(58) Field of Classification Search ...................... 706/20
See application file for complete search history.

(56) References Cited

U.S. PATENT DOCUMENTS

| 2005/0107127 | A1* | 5/2005 | Moriya | 455/566 |
| 2005/0181777 | A1* | 8/2005 | Kim | 455/418 |
| 2006/0184273 | A1* | 8/2006 | Sawada et al. | 700/245 |

FOREIGN PATENT DOCUMENTS

| JP | 2000-076167 A | 3/2000 |
| JP | 2002-007291 A | 1/2002 |
| JP | 2005-012819 | 1/2005 |
| KR | 1020000049956 A | 8/2000 |
| KR | 1020010087755 A | 9/2001 |
| KR | 1020020010434 A | 2/2002 |
| KR | 10-0471669 B1 | 2/2005 |
| KR | 1020060012818 A | 2/2006 |
| KR | 1020060073931 A | 6/2006 |
| KR | 1020060102603 | 9/2006 |
| WO | 2005/08893 A1 | 9/2005 |

OTHER PUBLICATIONS

A.F. Rovers; "HIM: A Framework for Haptic Instant Messaging", CHI 2004 Late Breaking Results Paper, Apr. 24-29, Vienna, Austria, pp. 1313-1316.

* cited by examiner

*Primary Examiner* — Jeffrey A Gaffin
*Assistant Examiner* — Li-Wu Chang
(74) *Attorney, Agent, or Firm* — Ladas & Parry LLP

(57) ABSTRACT

Provided are a method for expressing emotion and intention in remote interaction and a real emoticon system thereof. The system includes a real emotitoy and a terminal. The real emotitoy senses an input pattern corresponding to sensing information from outside and operates according to an expressing pattern corresponding to sensing information. The terminal generates a real emoticon by corresponding at least one of input pattern information and expression pattern information from the real emotitoy to visual symbolization information, transfers expression pattern information of a real emoticon transmitted from the outside to the real emotitoy, and transfers input pattern information of a real emoticon from the real emotitoy to the outside, where the input pattern information is created by selecting and combining at least one of input patterns and the expression pattern information is created by selecting and combining at least one of expression patterns.

17 Claims, 9 Drawing Sheets

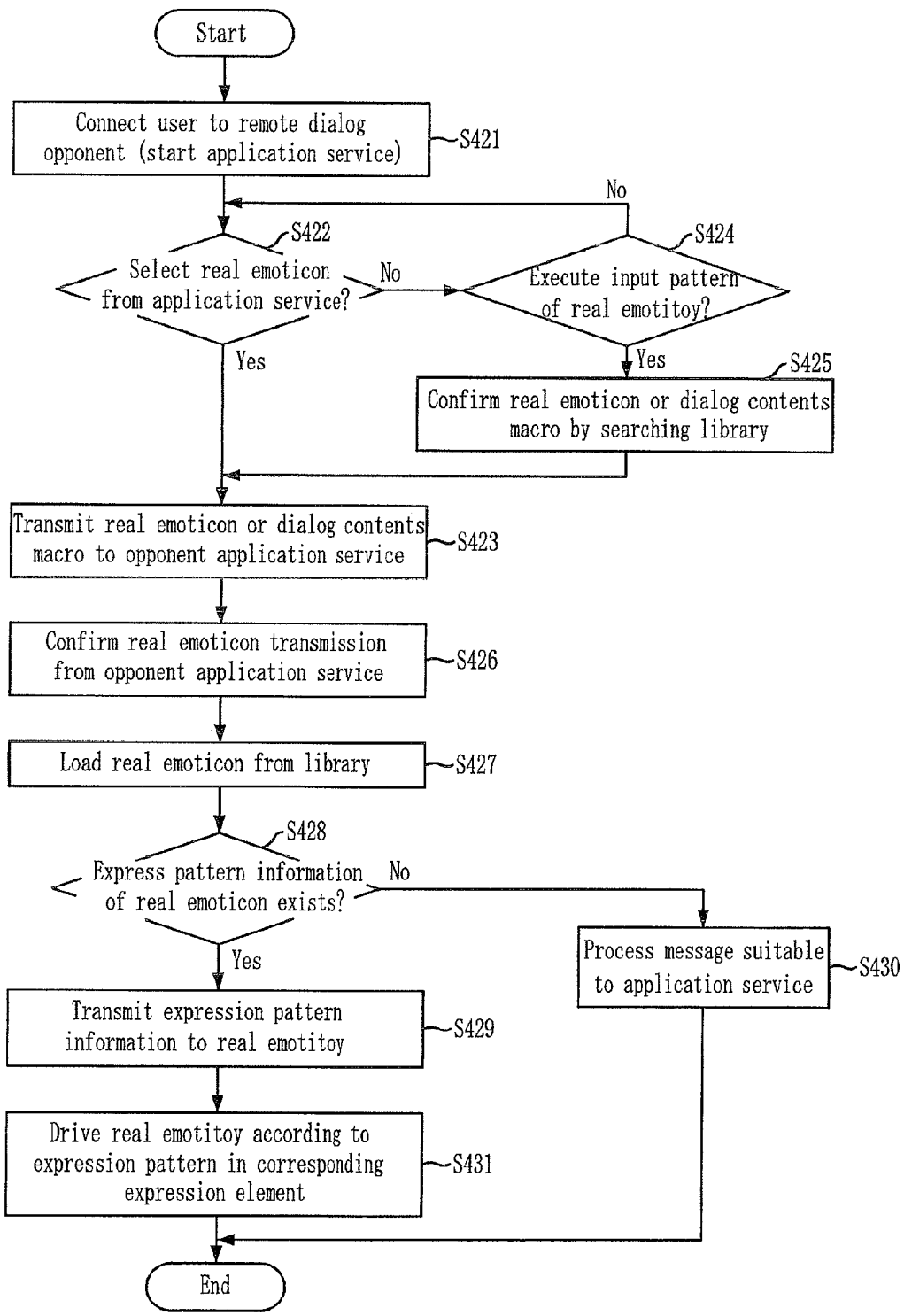

METHOD FOR EXPRESSING EMOTION AND INTENTION IN REMOTE INTERACTION AND REAL EMOTION SYSTEM THEREOF

This work was supported by the IT R&D program for MIC/IITA [2005-S-064-02, "Development of Smart Haptic Interface Device"].

CROSS-REFERENCE(S) TO RELATED APPLICATIONS

The present invention claims priority of Korean Patent Application No. 10-2006-0115182, filed on Nov. 21, 2006, which is incorporated herein by reference.

BACKGROUND OF THE INVENTION

1. Field of the Invention

The present invention relates to a method for expressing emotion and intention in remote interaction and a real emoticon system thereof; and, more particularly, to a method for expressing emotion and intention in remote interaction and a real emoticon system thereof, which allow a user to intuitively and realistically communicate with opponents by expressing or inputting a user's emotion and intention through an object having a realistic shape in a remote interaction environment.

2. Description of Related Art

Remote interaction is a technology that enables a user to communicate with an opponent in a remote location. Various remote interaction methods were introduced, for example, a wired/wireless telephone, an E-mail, a video conferencing, and an instant messenger.

The remote interaction has been advanced from a text based remote interaction for exchanging text based emotion and intention expressions between users in real time through a wired and wireless Internet to a multimedia based remote interaction for exchanging emotion and intention expressions with multimedia elements such as music, images, and video between users in real time.

Communication service providers have developed a remote interaction environment as a realistic virtual environment in order to satisfy the demands of users who want to clearly and dynamically express various desires such as emotions and intentions and to express various desires with characteristic and the feeling of movement rather than simple text based expression.

For example, an instant messenger enables users to chat in real time like a telephone. Through the instant messenger, the users can also exchange intentions in real time as well as transmitting memos, files, and documents through the Internet. The instant messenger was introduced with a text based dialog box. The instant messenger has been advanced to express users' emotions and intentions with images such as emoticons. The instance messenger has been further advanced to express user's emotion and intention expression using flash based moving images. Also, the instant messenger provides a realistic and friendly remote interaction environment to a user using background music and video conference.

Hereinafter, a method for expressing the emotion and the intention of a user according to the related art will be described.

A method for expressing the emotion and the intention of a user according to the related art was introduced in Korea Patent No. 471669.

In the Korea Patent No. 471669, a method of expressing a user's emotion through vibration instead of using the text message of a mobile communication terminal was introduced. Comparing to text based remote interaction, the introduced method enables a user to express emotions variously and dynamically using the vibration function of a mobile communication terminal.

However, the method of No. 471669 has following shortcoming. A user is only enabled to express simple emotion and intention expressions using the vibration function of a mobile communication terminal based on strength and duration time of vibration. Also, the method of No. 471669 cannot be applied to a mobile communication terminal having no vibration function. Furthermore, a user cannot directly control how to express emotions and intentions through vibration because unchangeable preset vibration expressions are provided in the method of No. 471669.

Another method for expressing user's emotion and intention expressions was introduced in Korea Patent Publication No. 2006-12818.

In the method of No. 2006-12818, avatars were used to express emotions and intentions in visually and acoustically.

However, the method of No. 2006-12818 has a difficulty to realistically and dynamically express emotion and intention expressions to an opponent because the avatars are a virtual object only displayed on a display unit of a mobile communication terminal.

SUMMARY OF THE INVENTION

An embodiment of the present invention is directed to providing a method for expressing emotion and intention in remote interaction and a real emoticon system thereof, which enables a user to realistically and intuitively communicate with an opponent in a remote location by expressing the user's emotion and intention through an object having a real shape in a remote interaction environment.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, there is provided a system for expressing emotion and intention in remote interaction including: a real emotitoy unit for sensing an input pattern corresponding to sensing information from outside and being driven corresponding to an expressing pattern corresponding sensing information; and a terminal for generating a real emoticon by corresponding at least one of input pattern information and expression pattern information from the real emotitoy unit to visual symbolization information, transferring expression pattern information of a real emoticon transmitted from the outside to the real emotitoy unit, and transferring input pattern information of a real emoticon from the real emotitoy unit to the outside, where the input pattern information is created by selecting and combining at least one of input patterns by a user and the expression pattern information is created by selecting and combining at least one of expression patterns by a user.

In accordance with another embodiment of the present invention, there is provided a method for expressing emotion and intention using a real emotitoy in remote interaction, including the steps of: confirming whether a real emoticon is received from outside for expressing emotion and intention when remote interaction is initiated; transferring expression pattern information for driving the real emotitoy in the transferred real emoticon to the real emotitoy; and at the real emotitoy, confirming the transferred expression pattern information and operating according to the classified expression pattern.

BRIEF DESCRIPTION OF THE DRAWINGS

FIG. 6A is a flowchart describing procedures of defining and generating real emoticon and registering the application of a real emoticon where the present invention is applied to.

FIG. 6B is a flowchart describing a procedure of transferring expression pattern information of a real emoticon to a real emotitoy where the present invention is applied to.

FIG. 6C is a flowchart describing a procedure of operating a real emotitoy according to input pattern information where the present invention is applied to.

DESCRIPTION OF SPECIFIC EMBODIMENTS

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Throughout the specification, a real emoticon is a symbolized command defined to express a user's emotion and intention to an opponent using an apparatus including input elements for receiving information from a user and expression elements for outputting information to a user while linking to a terminal. Such an apparatus is referred as a real emotitoy. The input elements of the real emotitoy are, for example, a camera as a visual input element, a microphone as an acoustic input element, a tactual sensor as a tactual input element, and an electrical noise as an olfactory input element. The expression elements of the real emotitoy are, for example, a light emitting device/a liquid crystal display device as a visual expression element, a speaker as an acoustic expression element, a vibration device/a heating/cooling element as a tactual expression element, and a fragrant spraying device as an olfactory expression element.

The real emoticon can be defined as follows.

At first, the real emoticon is defined by corresponding at least one of expression pattern maps to a typical visual emoticon, where the expression pattern maps are created by selecting and combining patterns expressed by expression elements and where the typical visual emoticon is composed as a combination of texts/numbers/symbols or graphic. The pattern expressed by the expression elements is referred as an expression pattern, hereinafter. When a user uses the real emoticon, the operations of the opponent's a real emotitoy are controlled according to expression pattern information.

Also, the real emoticon is defined by corresponding at least one of input pattern maps to visual symbolization information or a dialog contents macro function, wherein the input pattern maps are created by selecting and combining patterns expressed by input elements. The pattern expressed by the input elements is referred as an input pattern, hereinafter.

The real emoticon displays visual symbolization information or a dialog contents macro function on the opponent's a terminal according to corresponding input pattern information inputted through a real emotitoy of the opponent. Herein, the dialog contents macro function is previously defined by corresponding texts or real emoticons selected by a user to a macro keyword.

Figure 1:
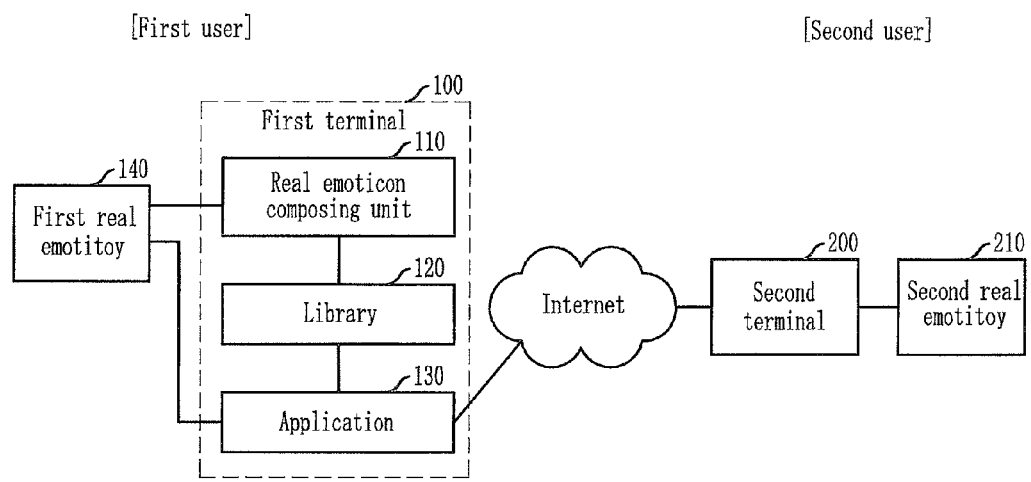
FIG. 1 is a diagram illustrating a real emoticon system for expressing emotion and intention in remote interaction in accordance with an embodiment of the present invention.

FIG. 1 is a diagram illustrating a real emoticon system for expressing emotion and intention in remote interaction in accordance with an embodiment of the present invention.

As shown in FIG. 1, the real emoticon system according to the present embodiment enables one of a first user and a second user to express emotion and intention to the other in remote interaction. That is, the first user uses a real emoticon system having a first terminal 100 and a first real emotitoy 140 interworked with the first terminal 100, and the second user also uses a real emoticon system having a second terminal 200 and a second real emotitoy 210. In the present embodiment, the first terminal 100 and the second terminal 200 are connected through the Internet. However, the present invention is not limited thereto.

If the first user transmits a real emoticon using a first real emoticon system to a second real emoticon system of the second user, the opponent, the emotion and the intention of the first user is expressed through the second real emotitoy 210.

The first and second real emoticon systems of the first and second users are the same in the present embodiment. Therefore, the first and second real emoticon systems will be described as a real emoticon system, hereinafter.

As described above, the real emoticon system includes a terminal 100 and a real emotitoy 140 that interworks with the terminal 100.

The terminal 100 includes a real emoticon composing block 110, a library 120, and an application 130.

The real emoticon composing block 110 interworks with the library 120 and the real emotitoy 140. Particularly, the real emoticon composing block 110 loads the list of the input patterns of input elements and the express patterns of expression elements is uploaded from the real emotitoy 140 when the real emoticon composing block 110 is initialized. The real emoticon composing block 110 provides the list of the input patterns and the express patterns to a user.

The real emoticon composing block 110 composes input pattern information or expression pattern information to express a user's emotion and intention by selecting and combining the input patterns of the input elements and the expression patterns of the expression elements in response to the control of a user. The real emoticon composing block 110 also composes visual symbolization information such as visual symbol elements including an icon image and a predetermined character by a user.

After composing the visual symbolization information, input pattern information, and expression pattern information, the real emoticon composing block 110 generates one real emoticon by combining the visual symbolization information and the input pattern information or the expression pattern information. The generated real emoticon is confirmed by operating the real emotitoy 140 or directly inputting the real emotitoy 140.

The real emoticon composing block 110 stores the generated real emoticon in the library 120.

As described above, the real emoticon composing block 110 operates the real emotitoy 140 to compose a real emoticon applied to a remote interaction service.

The library 120 stores the real emoticons generated by the real emoticon composing block 110 according to a typical storing format of the library 120. That is, the library 120 stores and manages input pattern information or expression pattern information of a real emoticon corresponding to the visual symbolization information index of a real emoticon in order to enable the application 130 to freely use the real emoticons.

The application 130 is an application program or software installed in the terminal 100. The application 130 provides a remote interaction service to a user for communicating with an opponent in a remote location by interworking with the library 120 and the real emotitoy 140. For example, the application 130 may be an internet messenger and telephone software, which can be installed in a computer, a wired telephone, and a mobile communication terminal.

Particularly, the application 130 exchanges real emoticons with an opponent terminal 200 during the remote interaction service. When the application 130 provides the remote interaction service to a user, the application 130 receives a real emoticon transmitted from the opponent terminal 200, extracts the real emoticon, visually displays visual symbolization information included in the extracted real emoticon on a dialog box, and expression pattern information included in the extracted real emoticon to the real emotitoy 140.

Also, the application 130 searches a real emoticon from the library 120 or a dialog contents macro stored in a memory (not shown) of a real emotitoy 140 corresponding an input pattern when the input pattern is sensed from an input element of the real emotitoy 140 during the remote interaction service. Then, the application 130 transfers the search real emoticon or the dialog contents macro to the opponent terminal 200.

The application 130 can link a real emoticon support function to a typical remote interaction service as plug-in. Or the real emoticon support function can be embodied as an independent application.

Hereinafter, the real emotitoy 140 will be described.

The real emotitoy 140 interworks with the terminal 100 and operates based on visual/acoustic/tactual/olfactory expression pattern information of the real emoticon, which is transferred from the application 130.

When the real emotitoy 140 senses the input patterns of visual/acoustic/tactual/olfactory input elements, which are previously defined in the input elements during the remote interaction service, the real emotitoy 140 confirms input pattern information corresponding the sensed input patters of the visual/acoustic/tactual/olfactory input element and transfers the confirmed input pattern information to the application 130.

Hereinafter, the real emoticon composing block 110, the application 130, and the real emotitoy 140 will be described with reference to the accompanying drawings.

Figure 2A:
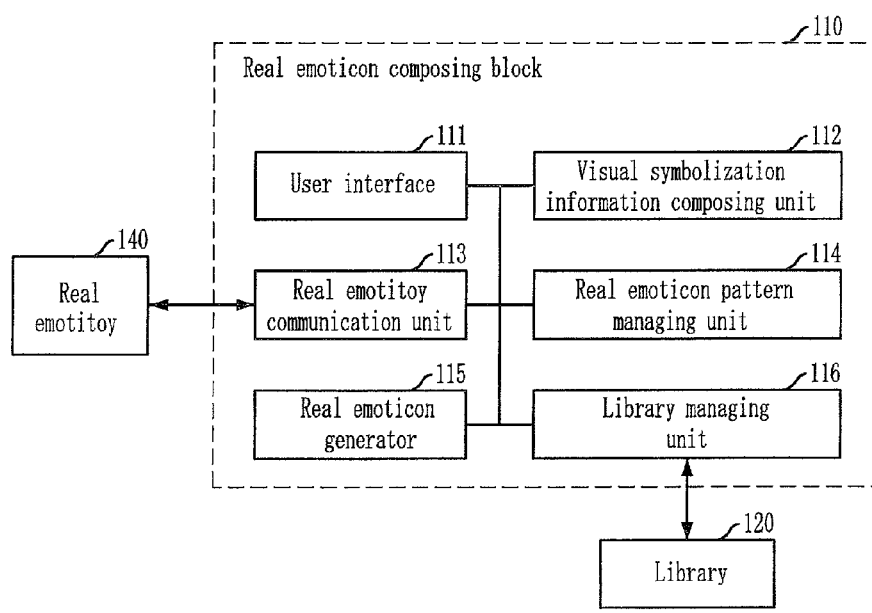
FIG. 2A is a block diagram illustrating a real emoticon composing block in accordance with an embodiment of the present invention.
Figure 2B:
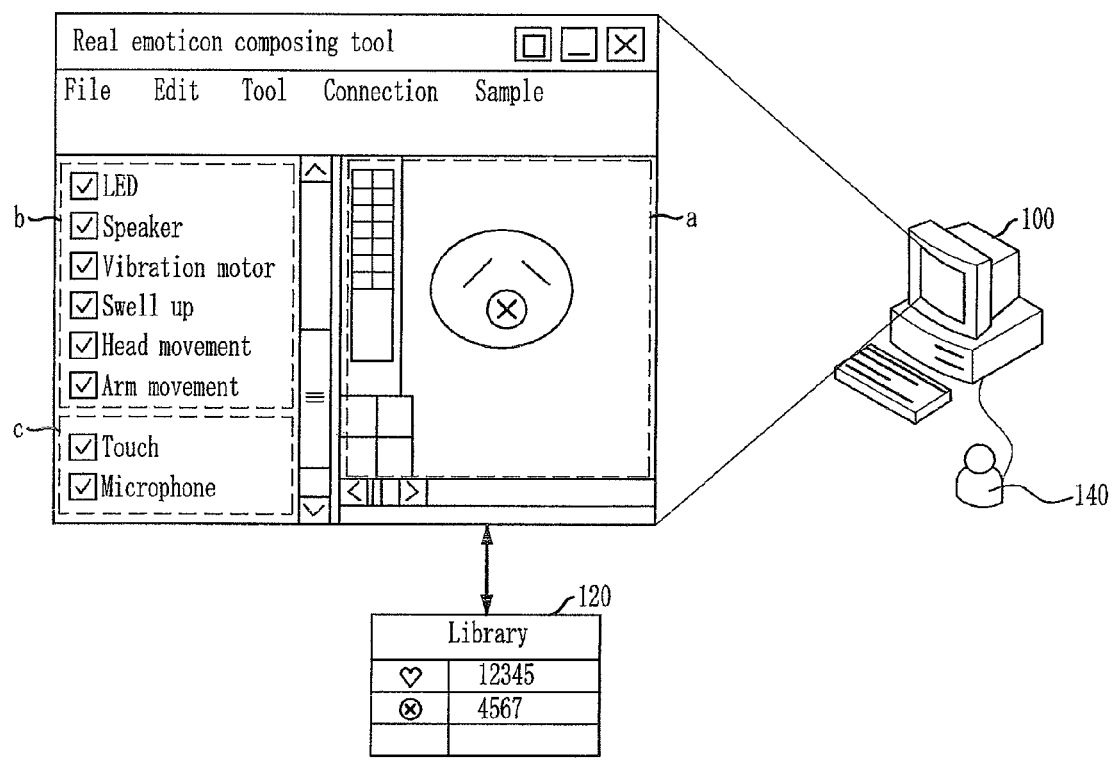
FIG. 2B is a diagram illustrating composing tools provided from the real emoticon composing block shown in FIG. 2A.

FIG. 2A is a block diagram illustrating a real emoticon composing block in accordance with an embodiment of the present invention, and FIG. 2B is a diagram illustrating composing tools provided from the real emoticon composing block shown in FIG. 2A.

As shown in FIG. 2A, the real emoticon composing block 110 includes a user interface 111, a visual symbolization information composing unit 112, a real emotitoy communication unit 113, a real emoticon pattern managing unit 114, a real emoticon generator 115, and a library manager 116. Herein, the real emoticon composing block 110 generates a real emoticon using the above constituent elements.

The user interface 111 provides a composing tool in a form of a 'paint' of MS windows operating system as shown in FIG. 2B through a graphic user interface (GUI). Hereinafter, the composing tool is referred as a real emoticon composing tool. The real emoticon composing tool enables a user to easily create a real emoticon corresponding to the visual symbolization information by selecting/combining the input patterns of the input elements and the expression patterns of the expression elements in the real emotitoy 140.

Referring to FIG. 2B, the user interface 111 provides a paint function (a) for composing image information for the visual symbolization information composing unit 112 through the real emoticon composing tool, an expression pattern list (b) of the expression elements of the real emotitoy 140 for the real emoticon pattern managing unit 114, and an input pattern list (c) of the input elements to a user.

Also, the user interface 111 provides a real emoticon generation function to a user through the real emoticon composing tool. The real emoticon generation function enables a user to create a real emoticon by corresponding the visual symbolization information provided from the visual symbolization composing unit 112 with input pattern information and expression pattern information provided from the real emoticon pattern managing unit 114.

Furthermore, the user interface 111 provides a user with the management functions of the library managing unit 116 such as storing/deleting/modifying a real emoticon in the library 120 through the real emoticon composing tool.

The visual symbolization information composing unit 112 enables a user to compose image or text information directly or using previously stored information.

The real emotitoy communication unit 113 synchronizes a communication protocol with the real emotitoy 140.

The real emoticon pattern managing unit 114 manages the input pattern list of the input elements and the expression pattern list of the expression element in the real emotitoy 140 by communicating with the real emotitoy 140 through the real emotitoy communication unit 113. The real emoticon pattern manager 114 uploads the input pattern list and the expression pattern list to the real emoticon composing tool when it is initialized.

The real emoticon pattern managing unit 114 generates input pattern information or expression pattern information according to input patterns or expression patterns selected or combined by a user through a real emoticon composing tool provided from the user interface 111.

The real emoticon generator 115 generates a real emoticon corresponding to the visual symbolization information from the visual symbolization information composing unit 112, and the input pattern information or the expression pattern information transferred from the real emoticon pattern managing unit 114 in order to embody a real emoticon composing tool provided through the user interface 111. The real emoticon generator 115 defines the real emoticon in a storing form of a library.

The library managing unit 116 stores, deletes, and modifies real emoticons transferred the real emoticon generator 115 in the library 120 in order to embody the real emoticon composing tool provided to a user through the user interface 111.

Figure 3A:
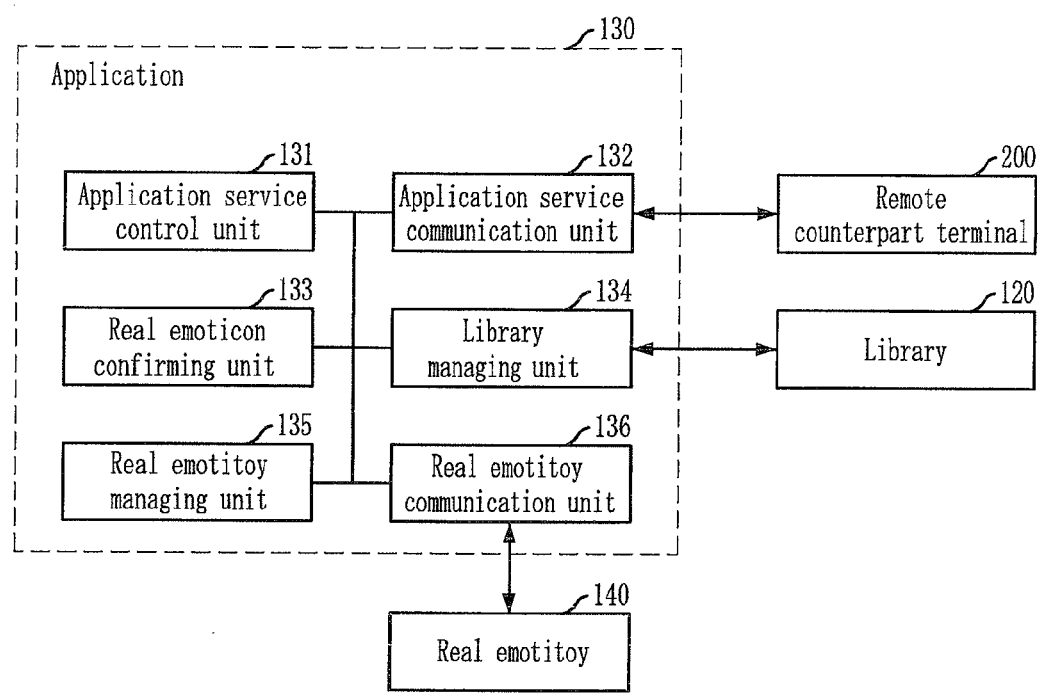
FIG. 3A is a block diagram illustrating an application in accordance with an embodiment of the present invention.

FIG. 3A is a block diagram illustrating an application in accordance with an embodiment of the present invention. In FIG. 3A, an Internet messenger is described as the application 130.

As shown in FIG. 3A, the application 130 includes an application service control unit 131, an application service communication unit 132, a real emoticon confirming unit 133, a library managing unit 134, a real emotitoy managing unit 135, and a real emotitoy communication unit 136.

The application service control unit 131 and the application service communication unit 132 perform related functions for providing a remote interaction service to an opponent in a remote location. The related functions denote a basic messenger function for communicating with the opponent in case of the internet messenger. The application service communication unit 132 communicates with the opponent terminal 200 in a remote location through the Internet based on a typical communication method.

The real emoticon confirming unit 133 confirms whether an opponent, for example, an opponent terminal, transmits a real emoticon or not in an Internet messenger dialog function. Also, the real emotion confirming unit 133 obtains the expression pattern of a corresponding real emoticon through the library managing unit 134 and transfers the obtained expression pattern to the real emotitoy managing unit 135.

The real emoticon confirming unit 133 provides a real emoticon list from the library managing unit 135 to a user and transfers a real emoticon selected by a user to the application service control unit 131. That is, the real emoticon confirming unit 133 provides a user with information about a real emoticon transferred to an opponent and a real emoticon to be transmitted.

A function of selecting and transmitting a real emoticon can be provided as plug-in. The real emoticon confirming unit 133 can confirm whether a real emoticon is used or not by linking the plug-in to the application service control unit 131. Furthermore, the real emoticon confirming unit 133 determines whether a real emoticon is used or not if a corresponding keyword is extracted by corresponding a predetermined keyword to a real emoticon in an Internet messenger dialog function. If it is determined that the real emoticon is used, a corresponding event is invoked.

If the real emoticon confirming unit 133 receives the input pattern information of the real emotitoy 140 from the real emotitoy managing unit 135, the real emoticon confirming unit 133 generates a predetermined event by performing a real emoticon or a dialog contents macro corresponding to the received input pattern information.

The library managing unit 134 provides expression pattern information of a real emoticon from the real emoticon confirming unit 133 and provides a real emoticon from the input pattern information.

The real emotitoy managing unit 135 transfers the expression pattern information transferred from the real emoticon confirming unit 133 to the real emotitoy communication unit 136 in order to transmit data based on a communication protocol with the real emotitoy 140. The real emotitoy managing unit 135 receives the input pattern information from the real emotitoy communication unit 136. A plurality of real emotitoys 140 may be provided.

The real emotitoy communication unit 136 communicates with the real emotitoy 140 based on a communication protocol defined to integrally control a plurality of the real emotitoys 140.

Figure 3B:
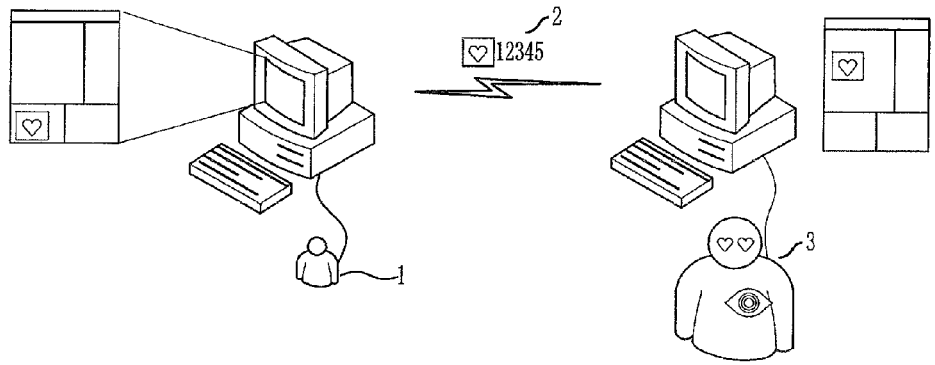
FIG. 3B is a diagram illustrating application services provided form application of FIG. 3A.
Figure 3B:
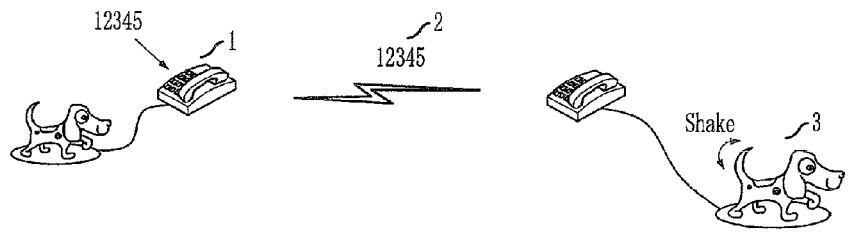
Figure 3B:
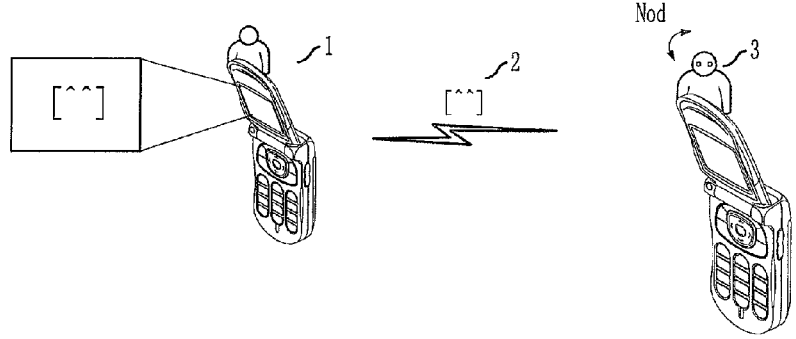

FIG. 3B is a diagram illustrating application services provided form application of FIG. 3A.

As shown in FIG. 3B, the application 130 is installed in an Internet messenger 137, a wired telephone 138, and a mobile communication terminal 139, and provides an application service to a user. FIG. 3B shows application service examples. In each of the application service example, a user selects a real emoticon at step S1, and a terminal 100 such as the Internet messenger 137, the wired telephone 138, and the mobile communication terminal 139 transmits real emoticon data. Then, an opponent real emotitoy 210 in a remote location expresses emotions and intentions based on the real emoticon data.

In case of the Internet messenger 137, if a real emoticon selected by a user is transmitted to the opponent terminal at steps S1 and S2, the image information of the selected real emoticon is visually displayed on a dialog box of an Internet messenger in the opponent terminal 200, and an opponent real emotitoy 210 is driven according to expression pattern information of a real emoticon at step S3.

In case of the wired telephone 138, a real emoticon library having expression pattern information defined corresponding numeral values is previously defined. If a user pushes predetermined numeral buttons at steps S1 and S2 while talking to an opponent through the wired telephone 138, a real emotitoy linked to an opponent wired terminal is driven according to expression pattern information corresponding to the numeral key values at step S3. It is preferable that real emoticons are defined and generated when a real emotitoy is manufactured and the real emotitoy operates according to the real emoticons defined and generated in the real emoticon library.

In case of the mobile communication terminal 139, when a user transmits a short message having a real emoticon to an opponent mobile communication terminal at steps S1 and S2, the opponent mobile communication terminal confirms the expression pattern information of a real emoticon included in the short message from the real emoticon library of the opponent mobile communication terminal and the real emotitoy of the opponent mobile communication terminal is driven according to the confirmed expression pattern information. In case of the mobile communication terminal 139, it is preferable that real emoticons are defined and generated when a real emotitoy is manufactured and the real emotitoy operates according to the generated and defined real emoticons.

Figure 4A:
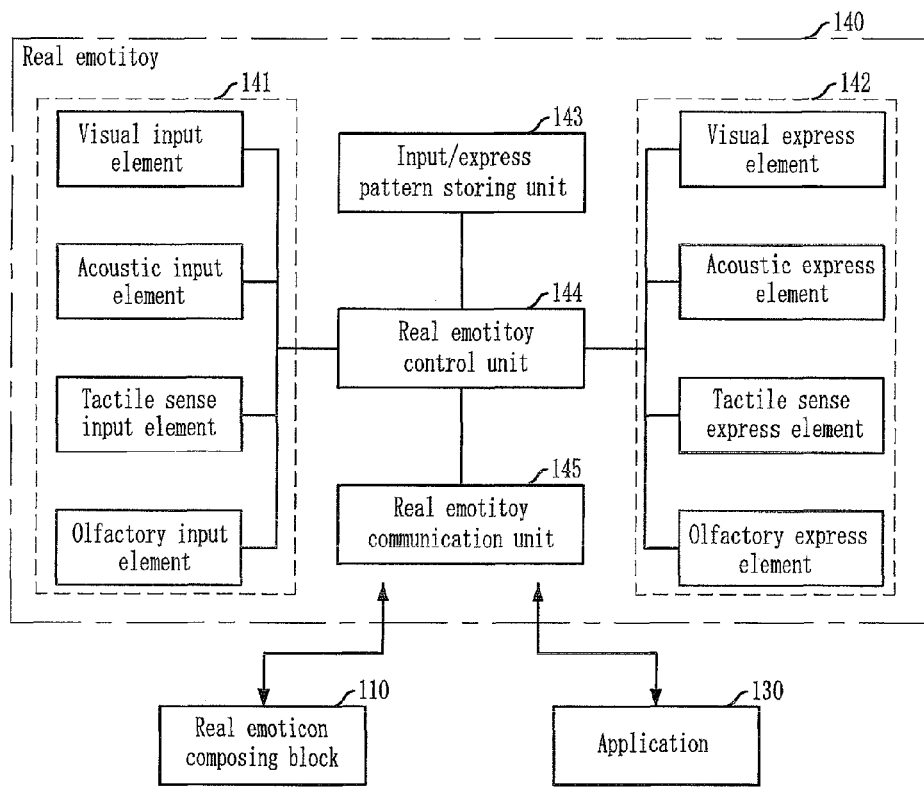
FIG. 4A is a block diagram illustrating a real emotitoy in accordance with an embodiment of the present invention.

FIG. 4A is a block diagram illustrating a real emotitoy in accordance with an embodiment of the present invention.

As shown in FIG. 4A, the real emotitoy according to the present embodiment includes visual/acoustic/tactual/olfactory input elements 141, visual/acoustic/tactual/olfactory expression elements 142, input/expression pattern storing unit 143, a real emotitoy control unit 144, and a real emotitoy communication unit 145.

The visual input element 141 may include an optical sensor or a camera. If the visual input element 141 sense a visual input pattern that is previously stored in the input/expression pattern storing unit 143, the visual input element 141 transfers the visual input pattern to the application 130.

The acoustic input element 141 may include a microphone. If the acoustic input element 141 senses an acoustic input pattern stored in the input/expression pattern storing unit 143, the acoustic input element 141 transfers the acoustic input pattern to the application 130.

The tactual input element 141 may include a touch sensor and a pressure sensor. If the tactual input element senses a tactual input pattern previously stored in the input/expression pattern storing unit 143, the tactual input element transfers the tactual input pattern to the application 130.

The olfactory input element 141 may include an electric noise. If the olfactory input element 141 senses an olfactory input pattern that is previously stored in the input/expression pattern storing unit 143, the olfactory input element 141 transfers the olfactory input pattern to the application 130.

The visual expression element 142 may include a light emitting diode (LED), a liquid crystal display (LCD). The visual expression element 142 operates according to the visual expression pattern information of expression pattern information transferred from the real emotitoy controller 144. For example, the visual expression element 142 turns on and off the light emitting device (LED) twice according to the expression pattern information of turning on/off the LED twice.

The acoustic expression element 142 includes a speaker. The acoustic expression element 142 operates according to the acoustic expression pattern information of expression pattern information transferred from the real emotitoy controller 144. For example, the acoustic expression element 142 outputs a voice message of "I love you" through the speaker according to the acoustic expression pattern information of "outputting a voice message "I love you".

The tactual expression element 142 includes a vibration element and a cold and warm element. The tactual expression element 142 operates according to the tactual expression pattern information of expression pattern information transferred from the real emotitoy controller 144. For example, the tactual expression element 142 drives the vibration element twice according to the tactual expression pattern information of "driving vibration element twice".

The olfactory expression element 142 includes a fragrant spraying device. The olfactory expression element 142 operates according to the olfactory expression pattern information of expression pattern information transferred from the real emotitoy controller 144. For example, the olfactory expression element 142 sprays a predetermined fragrant in the fragrant spraying device according to the olfactory expression pattern information of "spraying the fragrant".

The input/expression pattern storing unit 143 previously stores the input pattern lists of the input elements 141 and the expression pattern lists of the expression elements 142.

The real emotitoy controller 144 controls the visual/acoustic/olfactory/tactual input elements 141, the visual/acoustic/olfactory/tactual expression elements 142, the input/expression pattern storing unit 143, and the real emotitoy communication unit 145.

The real emotitoy controller 144 uploads the input pattern lists of the input elements 141 and the expression pattern lists of the expression elements 142, which are stored in the input/expression pattern storing unit 143 to the real emoticon composing block 110 when the real emoticon composing block 110 is initialized.

The real emotitoy controller 144 transfers an input pattern to the application 130 through the real emotitoy communication unit 145 if the input pattern inputted through the input elements 141 is matched to input patters stored in the real emotitoy storing unit 143.

The real emotitoy controller 144 receives expression pattern information from the application 130, classifies the received expression pattern information into a visual expression pattern, an acoustic expression pattern, a tactual expression pattern, and an olfactory expression pattern, and transfers the classified pattern to corresponding expression elements 142.

The real emotitoy communication unit 145 communicates with the real emoticon composing block 110 and the application 130 based on a predetermined communication protocol.

Figure 4B:
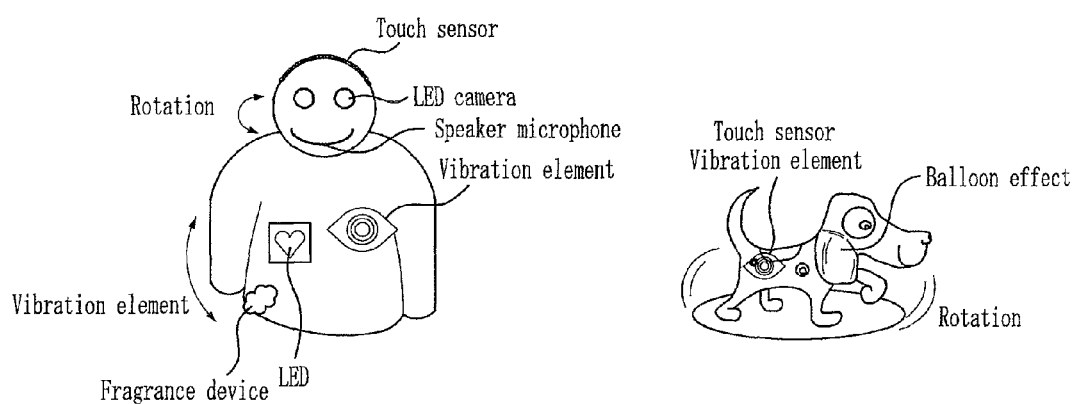
FIG. 4B is a block diagram illustrating a real emotitoy in accordance with another embodiment of the present invention.

FIG. 4B is a block diagram illustrating a real emotitoy in accordance with an embodiment of the present invention.

As shown in FIG. 4B, the real emotitoy 140 according to the present embodiment has various arrangements and configuration of input elements and expression elements.

Since the real emotitoy 140 is an object that represents an opponent in a remote location, it is preferable that the real emotitoy 140 may have an animal shape or a doll shape. However, the real emotitoy according to the present embodiment is not limited thereto. The real emotitoy 140 may be embodied as a plurality of objects. Particularly, the real emotitoy 140 may have a wearable shape to be worn on a user's body in order to synchronously transfer the tactual expression patterns. For example, the real emotitoy 140 may be embodied as a combination of a puppy and a puppy house, which are wearable on a wrist or a finger, or a combination of a flower shaped necklace and a flowerpot.

Due to such various shapes and configurations, the real emotitoy 140 can conveniently inform a user of a predetermined event although the user does not pay attention on the terminal 100. Since such shapes and configurations enable the real emotitoy 140 to sense and to express patterns at the same time, a user can conveniently lapse into communicating with the opponent.

Figure 5:
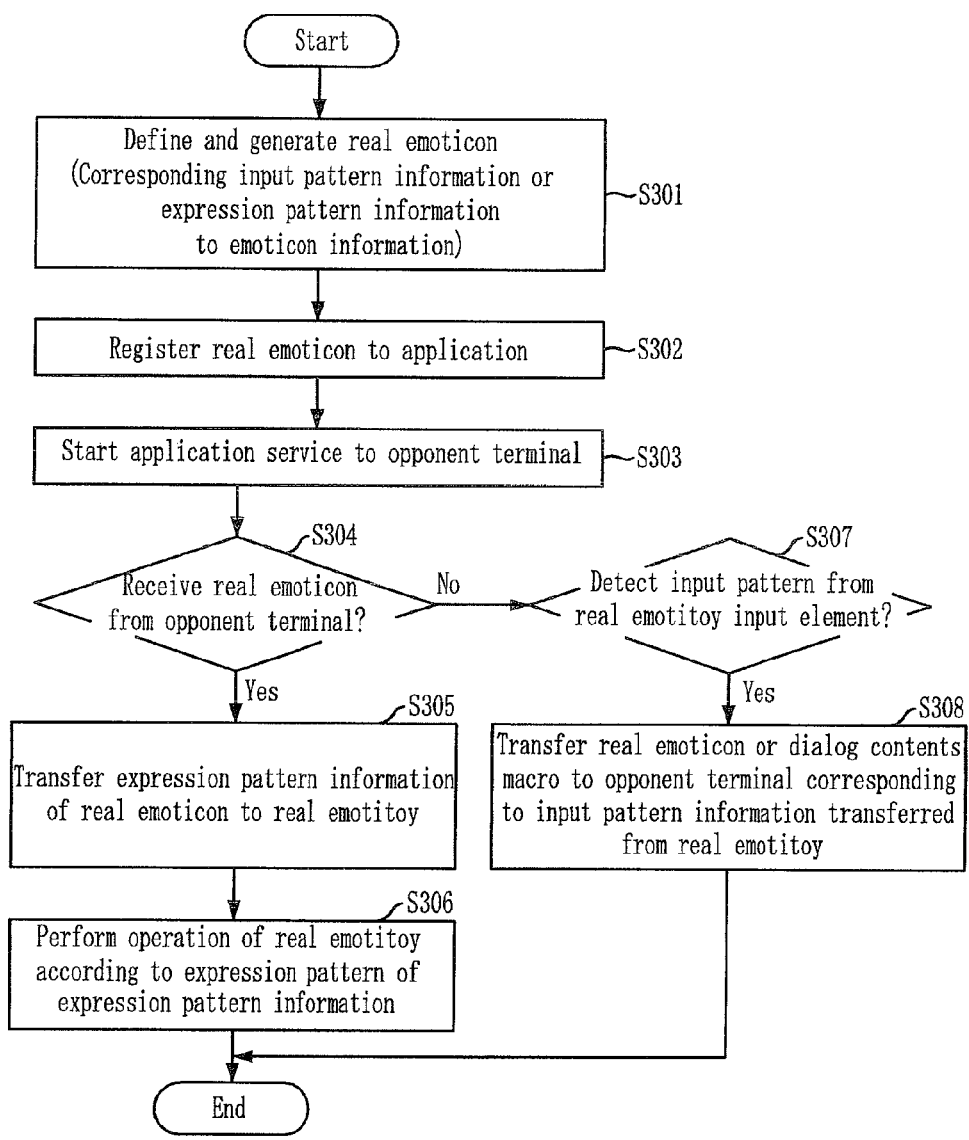
FIG. 5 is a flowchart describing a method for expressing emotion and intention in remote interaction in accordance with an embodiment of the present invention.

FIG. 5 is a flowchart describing a method for expressing emotion and intention in remote interaction in accordance with an embodiment of the present invention.

As shown in FIG. 5, a real emoticon system according to the present embodiment defines and generates a real emoticon at step S301. The real emoticon system provides a real emoticon composing tool to a user to define and generate a real emoticon.

The real emoticon system also uploads the input pattern lists and the expression pattern lists of input elements and expression elements in the real emotitoy 140 in order to set input pattern information or expression pattern information, which are selected and combined by a user.

Then, the real emoticon system generates one real emoticon by corresponding input pattern information or expression pattern information to visual symbolization information and sets the generated real emoticon in a library format.

Additionally, the real emoticon system may provide an application service using a real emoticon library provided when a real emotitoy is manufactured.

The real emoticon system registers the generated real emoticon at the application 130 at step S302. Herein, the real emoticon system provides a user with a function of registering an real emoticon in a library to an application 130 installed in a terminal 100. Also, the real emoticon system provides a user with functions of modifying or deleting a real emoticon.

At step S303, the real emoticon system initiates an Internet messenger dialog service with the opponent terminal 200 as an application service.

Then, if the real emoticon system receives a real emoticon from the opponent terminal 200 at step S304, the real emoticon system transfers the expression pattern information of the received real emoticon to the real emotitoy 140 at step S305.

The real emoticon system drives the real emotitoy 140 according to the expression pattern information at step S306.

If the input elements of the real emotitoy 140 sense a predetermined input pattern from a user at step S307, the real emoticon system transfers a real emoticon pr a dialog contents macro corresponding to the sensed input pattern information from the real emotitoy 140 to the opponent terminal 200 at step S308.

Hereinafter, the method for expressing emotion and intention in remote interaction in accordance with an embodiment of the present invention will be described in more detail with reference to FIGS. 6A to 6C.

Figure 6A:
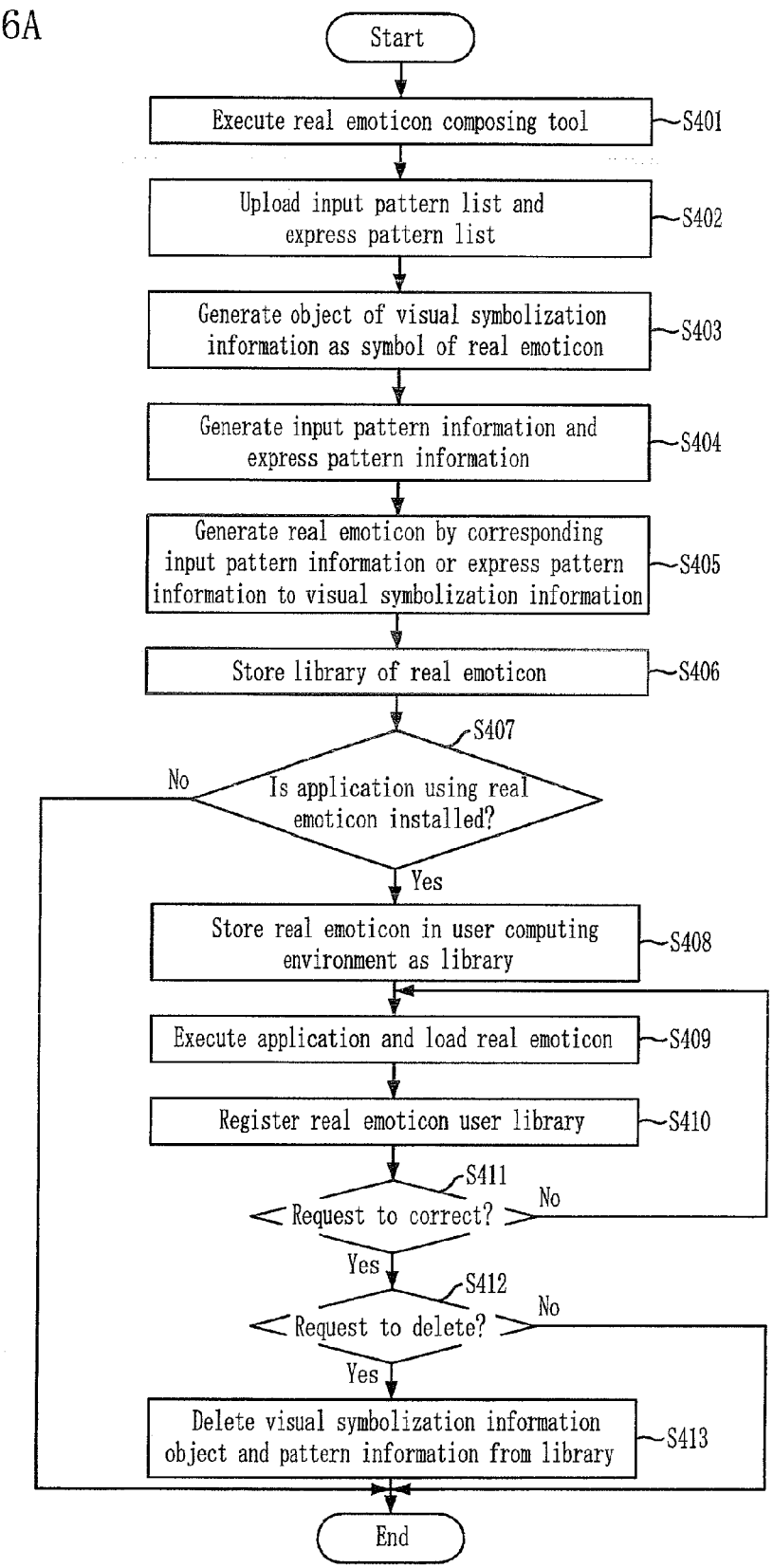
Figure 6C:
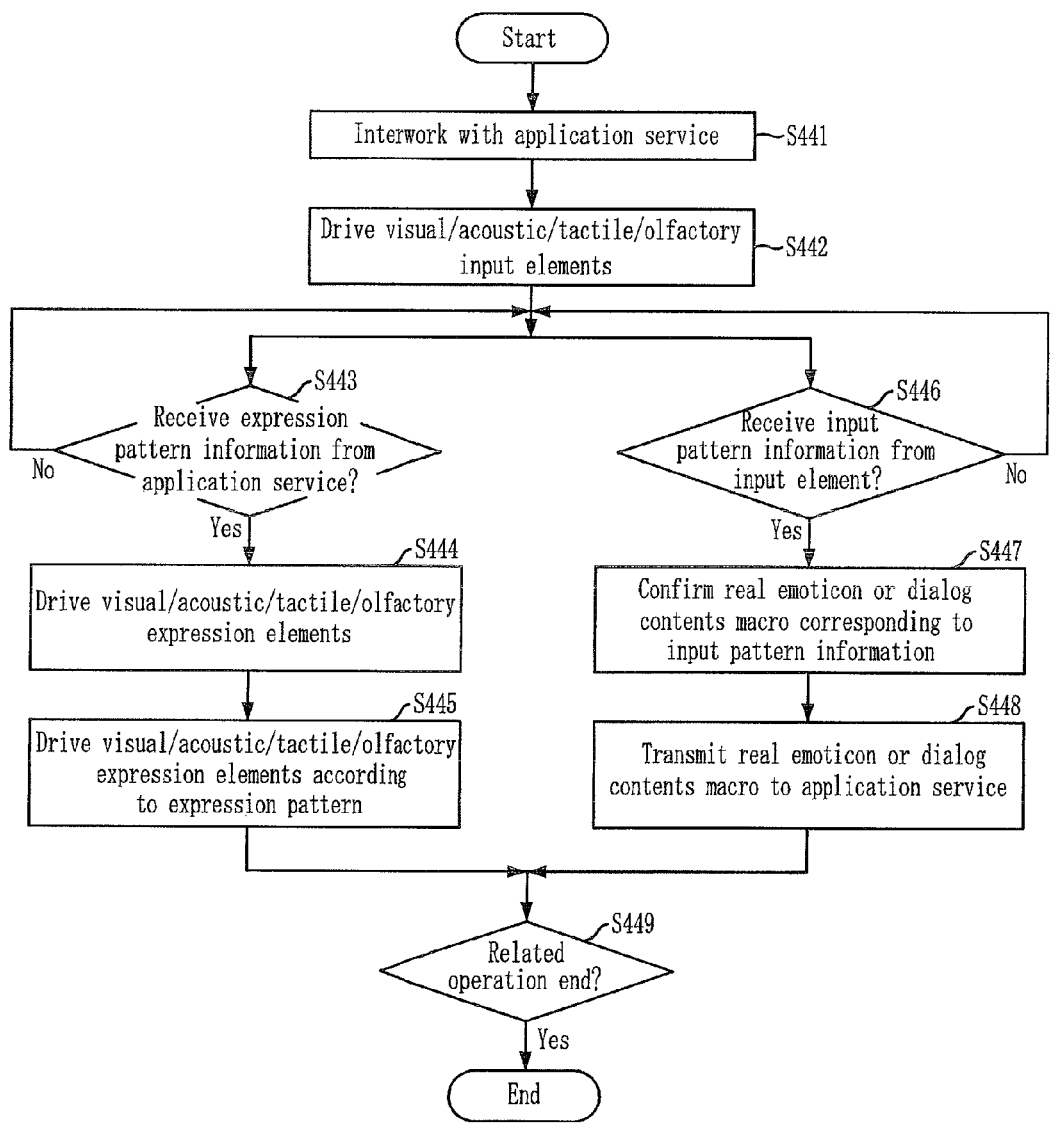

FIG. 6A is a flowchart describing procedures of defining and generating real emoticon and registering the application of a real emoticon where the present invention is applied to, FIG. 6B is a flowchart describing a procedure of transferring expression pattern information of a real emoticon to a real emotitoy where the present invention is applied to, and FIG. 6C is a flowchart describing a procedure of operating a real emotitoy according to input pattern information where the present invention is applied to.

At first, a procedure of defining and generating a real emoticon and a procedure of registering a real emoticon at an application will be described.

As shown in FIG. 6, when a real emoticon composing tool is executed by a user at step S4011, a real emoticon system uploads the input pattern list and the expression pattern list of a linked real emotitoy 140 at step S402.

At step S403, the real emoticon system creates the object of visual symbolization information, for example, picture, numbers, and texts, to be used as a symbol of a real emoticon by a user through the real emoticon composing tool. Also, if the real emoticon system receives a plurality of input patterns and expression patterns by a user, the real emoticon system generates input pattern information and expression pattern information at step S404.

The real emoticon system generates a real emoticon by corresponding visual symbolization information to input pattern information or expression pattern information at step S405. The real emoticon system stores the created real emoticon in a storing format of a library at step S406.

The real emoticon system determines whether an application using a real emoticon is installed or not at step S407. If the application is not installed at step S407, the real emoticon system stores a real emoticon library in a user computing environment at step S408.

If the application is installed at step S407, the real emoticon system loads a real emoticon at a real emoticon user library by executing the application at steps S409 and S410.

The real emoticon system may modify or delete a real emoticon according to related requests from a user at steps S411 and S412. Particularly, the real emoticon system deletes visual symbolization information and pattern information from the library according to the deletion request from a user at step S413.

Hereinafter, a procedure of transferring expression pattern information of a real emoticon to a real emotitoy 140 will be described in detail.

As shown in FIG. 6B, a user is connected to an opponent in a remote interaction using a terminal and an application service is initiated at step S421.

If a real emoticon is selected from the application service at step S422, the real emoticon system transfers a real emoticon or a dialog macro to an opponent application service at step S423. If a real emoticon is not selected and the real emotitoy 140 senses input patterns at step S424, the real emoticon system searches a corresponding real emoticon or dialog macro from the library 120 at step S425. The real emoticon system transmits the searched real emoticon or the searched dialog macro to the opponent application service at step S423.

Then, if the real emoticon system detects a real emoticon transmitted from the opponent application service at step S426, the real emoticon system searches a corresponding real emoticon from the library 120 and loads the searched corresponding real emoticon at step S427. Then, the real emoticon system confirms whether the library includes expression patterns corresponding to the loaded real emoticon or not at step S428. That is, if the corresponding expression pattern is included, the real emoticon system transmits the corresponding expression pattern information to the real emotitoy 140 at step S429. If not, the real emoticon system processes it as a message suitable to the application service at step S430.

The real emotitoy 140 classifies the expression pattern information from the real emoticon system by expression elements and operates corresponding expression elements according to the classifying result at step S431.

Hereinafter, a procedure of driving a real emotitoy 140 according to the input pattern information will be described in more detail. That is, the step S431 will be described in more detail.

As shown in FIG. 6C, the real emotitoy 140 is linked to an application service at step S441. The real emotitoy 140 operates visual/acoustic/tactual/olfactory input elements 141 at step S442.

If the real emotitoy 140 receives expression pattern information from an application service at step S443, visual/acoustic/tactual/olfactory expression elements 142 operate at step S444. That is, the real emotitoy 140 drives the visual/acoustic/tactual/olfactory expression elements 142 according to the classified expression patterns at step S445.

Then, if the real emotitoy 140 receives input pattern information from the visual/acoustic/tactual/olfactory input elements 141 at step S446, the real emotitoy 140 searches a previously stored real emoticon or dialog macro corresponding to the received input pattern and transmits the searched real emotion or dialog macro to an application service at steps S447 and S448.

Then, the real emotitoy 140 continuously operates or terminates in response to a user's control at step S449.

As described above, the method for expressing emotion and intention in remote interaction and the real emoticon system thereof according to the present invention allow a user to intuitively and realistically communicate with opponents by expressing or inputting a user's emotion and intention through an object having a realistic shape in a remote interaction environment.

Also, the method for expressing emotion and intention in remote interaction and the real emoticon system thereof according to the present invention enables a user to realistically and lively express the user's emotion and intention to an opponent.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

While the present invention has been described with respect to certain preferred embodiments, it will be apparent to those skilled in the art that various changes and modifications may be made without departing from the spirits and scope of the invention as defined in the following claims.

What is claimed is:

1. A system for expressing emotion and intention in remote interaction, comprising:
   a real emotitoy means for sensing an input pattern corresponding to sensing information from outside and being driven according to an expressing pattern corresponding to sensing information; and
   a terminal for generating a real emoticon by corresponding at least one of input pattern information and expression pattern information from the real emotitoy means to visual symbolization information, transferring expression pattern information of a real emoticon transmitted from the outside to the real emotitoy means, and transferring input pattern information of a real emoticon from the real emotitoy means to the outside, where the input pattern information is created by selecting and combining at least one of input patterns by a user and the expression pattern information is created by selecting and combining at least one of expression patterns by a user,
   wherein the terminal includes:
   a real emoticon composing means for composing a real emoticon using input pattern information created by selecting and combining input patterns uploaded from the real emotitoy means by a user, expression pattern information created by selecting and combining expression patterns uploaded from the real emotitoy means by a user, and visual symbolization information;
   a library means for storing the real emoticons composed by the real emoticon composing means; and
   an application means for transferring expression pattern information obtained from a real emoticon transferred from outside to the real emotitoy means, and confirming whether input pattern information transferred from the real emotitoy means is correspondent to real emoticon stored in the library means and transferring the confirmed input pattern information to the outside; and
   wherein the real emoticon composing means uploads a real emoticon transferred from outside to the library means according to performance and characteristics of the terminal.

2. The system of claim 1, wherein the real emotitoy means includes:
   at least one of expression element means for externally expressing expression patterns of sensing information;
   a pattern storing means for storing the expression patterns of the sensing information; and
   a real emotitoy control means for classifying the expression pattern information transferred from the terminal into expression patterns confirmed in the pattern storing unit and transferring the classified expression patterns to the expression element means.

3. The system of claim 2, wherein the real emotitoy means further includes:
   at least one of input element means for sensing input patterns of sensing information from the outside,
   where the pattern storing means stores the input pattern of the input element means, and
   where the real emotitoy control means confirms whether an input pattern sensed by the input element means is correspondent to an input pattern stored in the pattern storing means or not and transfers the sensed input pattern to the terminal.

4. The system of claim 2, wherein the real emotitoy control means uploads an input pattern list of the input element means and the expression pattern list of the expression element means to the terminal if the terminal composes a real emoticon.

5. The system of claim 1, wherein the real emoticon composing means provides real emoticons in advance, which are defined and generated when the real emotitoy means is manufactured.

6. The system of claim 1, wherein the application means searches the library means for inquiring expression pattern information of a real emoticon transferred from outside.

7. The system of claim 1, wherein the application means obtains expression pattern information of a real emoticon transferred from outside directly from a real emoticon.

8. The system of claim 1, wherein the real emoticon composing means includes:
   a user interface means for providing input element and expression element, which are uploaded to the real emotitoy means, and comprising visual symbolization information;
   a real emoticon pattern management means for generating input pattern information as a result of selecting and combining input patterns provided from the user interface means by a user and generating expression pattern information as a result of selecting and combining expression patterns provided from the user interface by a user;
   a visual symbolization information composing means for generating visual symbolization information of a real emoticon to be defined through the user interface means;
   a real emoticon generating means for generating a real emoticon using input pattern information or expression pattern information, which are generated by the real emoticon pattern management means, and visual symbolization information generated by the visual symbolization information composing means; and
   a library management means for transferring a real emoticon generated by the real emoticon generating means to the library means and obtaining configuration information of a real emoticon stored in the library means.

9. The system of claim 8, wherein the user interface means provide user commands and user interfaces to perform internal processes of the real emoticon pattern management means, the visual symbolization information composing means, the real emoticon generating means, and the library management means.

10. The system of claim 8, wherein the library management means stores, deletes, and modifies a real emoticon generated by the real emoticon generating means in the library means.

11. The system of claim 8, wherein the library management means sores a real emoticon according to a format defined by the real emoticon composing means and the application means.

12. The system of claim 1, wherein the application means includes:
   a real emoticon confirming means for confirming whether a real emoticon is used by a user or not and conforming input pattern information transferred from the real emotitoy;
   a library managing means for inquiring expression pattern information of a real emoticon confirmed by the real emoticon confirming means to the library means, and inquiring a real emoticon corresponding to input pattern information confirmed by the real emoticon conforming means to the library means; and
   a real emotitoy managing means for transferring expression pattern information inquired by the library managing means and transferring a real emoticon corresponding input pattern information inquired by the library managing means.

13. The system of claim 12, further comprising:
an application service control means for providing a remote interaction service to a user by providing visual symbolization information of a real emoticon transmitted from outside, a real emoticon to be transmitted by a user, and a real emoticon registered to the library means.

14. The system of claim 12, wherein the real emoticon confirming means confirms whether a corresponding keyword is extracted or not by corresponding a real emoticon to a predetermined keyword in remote interaction in order to confirm whether a real emoticon is used or not.

15. The system of claim 12, wherein the real emoticon confirming means performs a ream emoticon corresponding to input pattern information or perform a preset dialog contents macro function if input pattern information is transferred by the real emotitoy managing means.

16. A method for expressing emotion and intention using a real emotitoy in remote interaction, comprising the steps of:
confirming whether a real emoticon is received from outside for expressing emotion and intention when remote interaction is initiated;
transferring expression pattern information for driving the real emotitoy in the transferred real emoticon to the real emotitoy; and
at the real emotitoy, confirming the transferred expression pattern information and operating according to the classified expression pattern, and
wherein the step of confirming whether a real emoticon is received includes the steps of:
confirming whether the transferred input pattern from the real emotitoy is correspondent to a previously stored input pattern if an input pattern is sensed from the real emotitoy;
confirming a real emoticon corresponding to the transferred input pattern transferred from the real emotitoy if the transferred input pattern from the real emotitoy is correspondent to the previously stored input pattern; and
transferring the confirmed real emoticon to outside.

17. The method of claim 16, further comprising the steps of, before the step of confirming whether a real emoticon is received:
generating input pattern information by selecting and combining uploaded input patterns and expression pattern information by selecting and combining uploaded expression patterns if an input patterns or expression patterns are uploaded by the real emotitoy; and
generating and registering a real emoticon using one of the input pattern information and the expression pattern information and visual symbolization information.

* * * * *